Loyd G. Dorsett
INVENTOR.

Fig.8

Loyd G. Dorsett
INVENTOR.

Feb. 18, 1958 L. G. DORSETT 2,824,304
METHOD AND APPARATUS FOR LOCATING TARGETS BY
OBSERVATIONS MADE BY AN AIR-BORNE OBSERVER
Filed Nov. 4, 1953 5 Sheets-Sheet 5

Fig. 10

Loyd G. Dorsett
INVENTOR.

BY
Attorneys

United States Patent Office 2,824,304
Patented Feb. 18, 1958

---

2,824,304

METHOD AND APPARATUS FOR LOCATING TARGETS BY OBSERVATIONS MADE BY AN AIRBORNE OBSERVER

Loyd G. Dorsett, Norman, Okla., assignor to Dorsett Laboratories, Inc., Norman, Okla., a corporation of Oklahoma Application November 4, 1953, Serial No. 390,237

14 Claims. (Cl. 343—112)

This invention relates to a method and apparatus for determining the coordinates of a point on the earth's surface which is not directly visible or accessible, relatively to a fixed reference system, and it has for its object to determine the coordinates, characteristic for the exact location of this point, by means of a combination of mobile air-borne observation means and ground observation means.

According to the invention the mobile air observation of the desired point is carried out by air-borne equipment and an air-borne observer moved into a position in which the point to be located is directly observable, at least temporarily, which position of the air-borne equipment and observer is so selected that the latter is simultaneously observable from the fixed ground station, and in determining the coordinates of the point to be located, relatively to the mobile reference system centered in the observation means of said air-borne observer at an instant determined and marked by the transmission of a signal, in which instant also the coordinates of the air-borne equipment and observer relatively to a ground station are determined. The combined simultaneous observation thus permits exact and precise determination of the coordinates of the desired point relatively to a fixed reference system.

The invention may be used for the location of any point which is inaccessible, or does not permit direct observation from ground or photography from air, but its primary practical purpose consists in the locating of a field artillery target by means of observations made by a mobile air-borne observer. The invention has for its main and general purpose to convert the method of locating the point or target into an operation which can be performed with greatest precision during a single target sighting run of an airplane carrying the observer, the obtained precision being such that no further observation either by ground observers or by air-borne observers and no adjusting rounds are necessary.

An essential characteristic of the method according to the invention consists in the strict simultaneity of the data collection on the airplane and in a ground station, whether such data collection is performed by reading suitable instruments or by causing automatic apparatus to register or transmit data at a precise moment, the simultaneity of the observations being secured by signals exchanged between the mobile air-borne observer in an airplane and the ground station or ground stations. This simultaneity of the observations or data registration permits a high precision of the target or point location which has not been obtained with systems based solely on observations made either from an airplane or from a ground station or on observations not correlated in time.

The method according to the invention may be carried into effect in various ways and while the principle is the same, the distribution of the observations between the two types of observers (one on the ground, the other air-borne) and the distribution of the data collecting or registering activity between the observers and their equipment which registers data automatically varies according to the performance of the aircraft, the possibility or advisability of using complex equipment and according to other circumstances.

An essential characteristic of the invention consists in obtaining target location data on and relatively to an airplane in motion at the same time at which the location of the observing plane in motion is determined on the ground, thus permitting to link the two series of observations and making them combinable parts of a single measurement.

Essentially only five geometrical data are necessary to determine the coordinates of a point, such as a target, relatively to a fixed reference system with precision. Usually these data are the azimuth and the depression angle of the target as observed from the airplane, the altitude of the plane above ground station, or its slant range and the elevation angle and azimuth of the airplane as measured from a ground station. As observation of instruments by the air-borne observer is the most difficult phase of the observational activity, it is an object of the invention to reduce the observational activity of the air-borne observer to a minimum, an object which may be attained either by modifying the method to such an extent that the observational activity of the air-borne observer is reduced while the share of the ground observer is increased, or by providing the air-borne observer with equipment which automatically registers the necessary data and transmits them to a ground station so that the observer's manual and observational activity is materially reduced.

Therefore a further main object of the invention consists in providing automatic equipment suitable for observations made on high performance airplanes with which the largest possible number of observation data may be registered or recorded and automatically transmitted to ground observers and data recorders, this data being recorded and combined automatically with data furnished simultaneously by ground observation of the airplane and being then supplied to suitable computing devices furnishing data directly utilizable for directing the fire.

A further main object of the invention consists in modifying the method and the equipment necessary for carrying the said method into effect in such a manner that the number of instrument readings to be made by the air-borne observer is reduced and, in some cases, is even reduced solely to the sighting of the target, while the remainder of the observations is made from the ground and essentially consists in determining the elevation, slant range and/or altitude of the plane carrying out the observation at the moment of the observation.

In addition to these main objects of the invention which have been outlined in a general manner, the invention has a number of ancillary objects which are better explained in connection with a more detailed description of the method itself.

In order to explain the method according to the invention and the equipment which has been developed in order to carry the method into effect, reference will be had to the annexed diagrammatic drawings illustrating partly the geometrical principles involved and partly diagrammatically illustrating the means used for registering data and producing the desired combination of data and computation converting the observed data into data which may be directly utilized. The drawings are diagrammatic and purely illustrative and do not contain any survey or detailed illustration of the apparatus used, the great majority of the apparatus used being standard equipment used for various other purposes.

The diagrams shown in the drawings, insofar as they represent equipment or the connections between units must be regarded as examples illustrating the invention to such an extent that it is possible to explain the principle of the invention and the best mode of applying said principle. Insofar as said diagrams show specific equipment it is to be understood that such equipment is an example only and that such illustration is not intended to be limitative.

According to the methods used at present, targets are observed either by ground observers or by air-borne observers and trial shells are fired. By reports of the amount and direction of the error when firing trial shells, the guns are brought to bear on the target, the repeated trial rounds being called "adjustment rounds."

The observer in this case must keep the target under constant surveillance. He can only estimate the extent of the error when an "adjustment round" is fired and, although the observer can be trained to considerable efficiency, human error and non-uniformity of judgment of different observers and further the time lapse involved and the waste of ammunition are disadvantages of this method. The method practically excludes or reduces the possibility of shelling targets of opportunity, as the enemy by virtue of the adjusting rounds is given a warning and the element of surprise is lost; especially mobile targets in a position to take action after being warned by adjustment rounds, are practically not vulnerable by this method.

The primary object of the method is therefore, as above explained, to determine and report a target's exact location at first sight, or during an observation run which is as short as possible, to eliminate the necessity of adjusting rounds, to reduce personnel errors, especially those relating to the estimation of the deviation of the adjustment rounds, and to evolve a system with which targets of opportunity may be efficiently taken under fire without any previous warning.

The method and the devices used for locating targets must of course also be suited to the aircraft which is available for such location. Generally speaking, two types of aircraft are available and therefore the methods used, while not differing basically, differ in accordance with the special conditions encountered in using these two types of aircraft. One type of aircraft is the organic light aircraft which, however, is limited with respect to altitude and to locations which will allow them to avoid ground fire and fighter aircraft. Another type of aircraft is a high performance aircraft which can make deep penetration into enemy territory and which can therefore cover the space within the range of heavy artillery. However, with high performance aircraft penetrating into enemy territory a location of the target at first sight and signalling of such location during such first sight is almost indispensable and the location and reporting of such location must be made within a minimum of time in view of the high speed of the aircraft. The acquiring of the target and the determination of the location data must therefore be performed within such a short time that the observer on the aircraft is not in a position to read a number of instruments with high accuracy.

As has been explained, target observation by an air-borne observer according to the invention entails the determination of the aircrat's position, its altitude, and its elevation, or its slant range at the exact moment at which the air-borne observer determines the target data. The equipment therefore consists of air-borne equipment and of ground equipment, including optical instruments of the highest precision, in order to locate the position of the aircraft as accurately as possible. It is also essential that communication between the aircraft and the ground station is maintained, this being done partly by known means which are not described, insofar as the means do not differ from known communication or signal means.

The basic target location method entails the measurement and the transmission of all the basic data, corresponding to basic geometrical requirements to a data recording station whether the data are obtained by observation or are registered automatically by suitable equipment, and whether they are acquired on the airplane or on ground. The main condition is solely that they must have been acquired simultaneously. The "basic target location method" may therefore be used for all types of aircraft, provided that air-borne and ground equipment suited to the aircraft are available.

The simplified methods are more restricted in their application. Their object is to eliminate one or more measurements by special arrangements or by special signalling methods. Fundamentally, however, all the methods are the same.

The method which may be used with all kinds of air-borne equipment will therefore be termed hereinafter target location "basic method." It consists, according to the invention, in making simultaneously measurements on an airplane to determine azimuth and horizontal range of a target relatively to the plane, and measurements on the ground to determine azimuth and horizontal range of the airplane relatively to said ground station. The two resulting sets of data when added geometrically (vectorial addition) permit the determination of the azimuth and range of the target relatively to the ground station.

Figure 1:
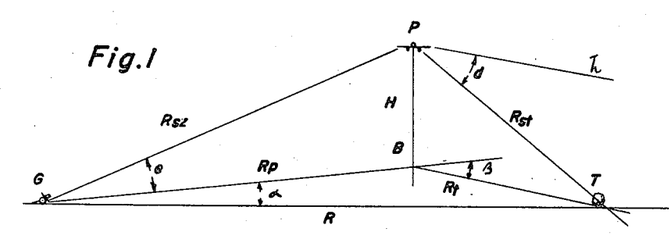
Figures 1, 2, 3 and 4 are diagrams illustrating the geometrical relations between the data which are observed or registered and the data locating the target, Figure 1 being a diagram illustrating the method which is hereinafter termed "basic method," Figures 2 and 3 being a diagram illustrating a simplification of the "basic method" hereinafter termed "single ray method" and Figure 4 illustrating a method in which the observation on ground is expanded in order to reduce observation on the airplane and hereinafter termed "multiple flash" method.

The geometry of this "basic target location method" is shown in Figure 1. Let G be the ground station and P an airplane whose observer sets his sight on the target T. Then, the observer on the airplane P and the observer on the ground G make simultaneously the following measurements. On the airplane the altitude H (BP) of the plane, the depression angle $d$ (being the angle between the horizontal line $h$ established by a spirit level or a suitable gyroscopic means, and the line PT along which the target is sighted from the airplane) and the azimuth of the target is measured, the latter being determined relatively to the airplane axis, which measurement is supplemented by noting the heading and/or other positional data of the airplane at the time of measurement.

Simultaneously with the reading of the above data on the airplane, the ground observer reads the elevation $e$ (being the angle between the horizontal GB and the line of sight of the plane GP as seen from the ground station G) and the azimuth A of the airplane and the slant range $R_{sl}$, if available.

The altitude determined on the airplane may be checked by measurements on ground duplicating or supplementing those already obtained in order to increase the precision of the method.

The altitude H of the plane P and the elevational angle $e$ permit the determination of the horizontal ground station-airplane range $R_p$, the altitude H and the depression angle $d$ permit the determination of the horizontal airplane-target range $R_t$. The azimuth difference (angle $\alpha$) and the horizontal ranges, $R_p$, $R_t$ permit the computation of the ground station-target range R.

The azimuth plane-to-target may be measured on the plane by using a gyro-compass, while the azimuth to plane position, being a measurement relatively to a fixed base line, may be determined by a ground observer with any suitable instrument provided with an azimuth scale. The difference between these two angles is the angle $\alpha$.

It is seen from the above brief description of the "basic target location method" that in order to carry it into effect it is necessary to provide a ground station, capable of determining a plane's location at a given instant, which determination may be made either by sight or by short wave radio. It is further necessary to have a signaling system permitting the emitting of a signal from the airplane in the moment in which the target is sighted and in which the actual reading of the various instruments occurs and it is finally necessary to provide an equipment on the plane, permitting the observer to determine the depression angle, the azimuth of the target relatively to the plane, and the altitude of the plane.

The radar equipment on the ground is obviously identical with the standard equipment for locating aircraft and therefore need not be described. Obviously, the equipment now in use, and preferably the equipment permitting high accuracy, for determining elevation and slant range of an aircraft may be used without change. Such radar units determining elevation and slant range of an aircraft also customarily employ automatic tracking units which, once a plane has been located, follow automatically the plane position. If the slant range of the plane and its elevation angle relatively to the ground station are both measurable no altitude measurement on the plane is necessary. However, slant range and altitude measurements may be used to correct each other so as to obtain a higher precision.

If optical instruments are used on ground (as is assumed in the diagram illustrating the invention) the simplest ground equipment may practically consist of an optical surveying instrument with azimuth and elevation scales. It is preferable to use an optical instrument equipped with a tracking aid which keeps the instrument pointed on the plane.

Some radar units measure the slant range only (and nothing else). It is also possible to combine an optical instrument with such a radar unit which permits to determine currently the slant range of the airplane.

The equipment used at the ground station in connection with the "basic target location method" need therefore not be specifically described as it reduces itself to well known radar units or to well known optical instruments.

The signalling system between the aircraft and the ground station is preferably also of the well known short wave type which permits telephone conversation and/or signalling. However, preferably special signals operated by the aircraft observer are used; as will be seen from the following description; this is even indispensable when data are transmitted automatically. For this type of signal the transmission which is usually employed is either a pulse digital or a pulse time transmission both of which systems—well known in themselves—may be used. The signal for reading the instrument on ground may also be given by means of an optical flash signal emitted from the aircraft in the moment when the observer after having sighted the target reads the depression angle, the azimuth and the altitude H.

When the organic light aircraft of the usual type is used, the observer in the aircraft must be equipped with an optical sight, with an azimuth scale and a tracking unit, the control knob of the latter permitting to keep the sight on the target, and with a vertical angular scale and knob. Further, the observer must be equipped with a readily operable switch, such as a push button switch, located near the controls for signalling the time of reading of the instruments after having sighted the target, as above explained, which time signal is then transmitted either by one of the above mentioned methods, or by connecting an audio oscillator to the customary two-way short wave radio which produces a characteristic tone or signal. Of course, the voice radio may also be used to give the required signal.

The "basic target location method" has the advantage that the reading of the instrument may be performed at any moment selected by the observer in the plane. Therefore, as soon as the target becomes visible in a favorable position the observer may set his sights on the target and immediately transmit a signal followed by the reading of the compass heading, the azimuth deflection angle of the target and the depression angle and in most cases also followed by the altitude reading.

The ground observer upon receipt of the signal records this information together with the azimuth, elevation and/or the slant range of the plane which he observes. The range data for the target are then computed using the trigonometric formula which is usually termed the "law of cosines."

The ground observer station and the gun station is normally not identical. The range for the guns is computed from the result obtained by means of the method above outlined with a paralax correction obtained by using well known trigonometric formulas. It is therefore seen that the method, if relatively slow airplanes are used, may be carried out largely by observers without any automatic data registering apparatus. As the reading is affected by the roll, pitch and yaw of the aircraft it is sometimes necessary either to use gyro-stabilized instruments, or to use instruments measuring or registering the roll and pitch at the moment at which the reading of the instruments occurs. The roll and pitch data must then be added to those of the readings made by the observer for correction of the observed data. This correction is however not always necessary. When light aircraft is used the pilot may fly his aircraft in such a manner that the wings of the aircraft are kept level and if the air is not turbulent readings of adequate accuracy may be obtained even without the addition of roll and pitch registering or correcting equipment.

For high performance aircraft operating at high speed however the observer must be provided with equipment requiring a minimum of personal effort to transmit accurate target location data.

Figures 5, 6:
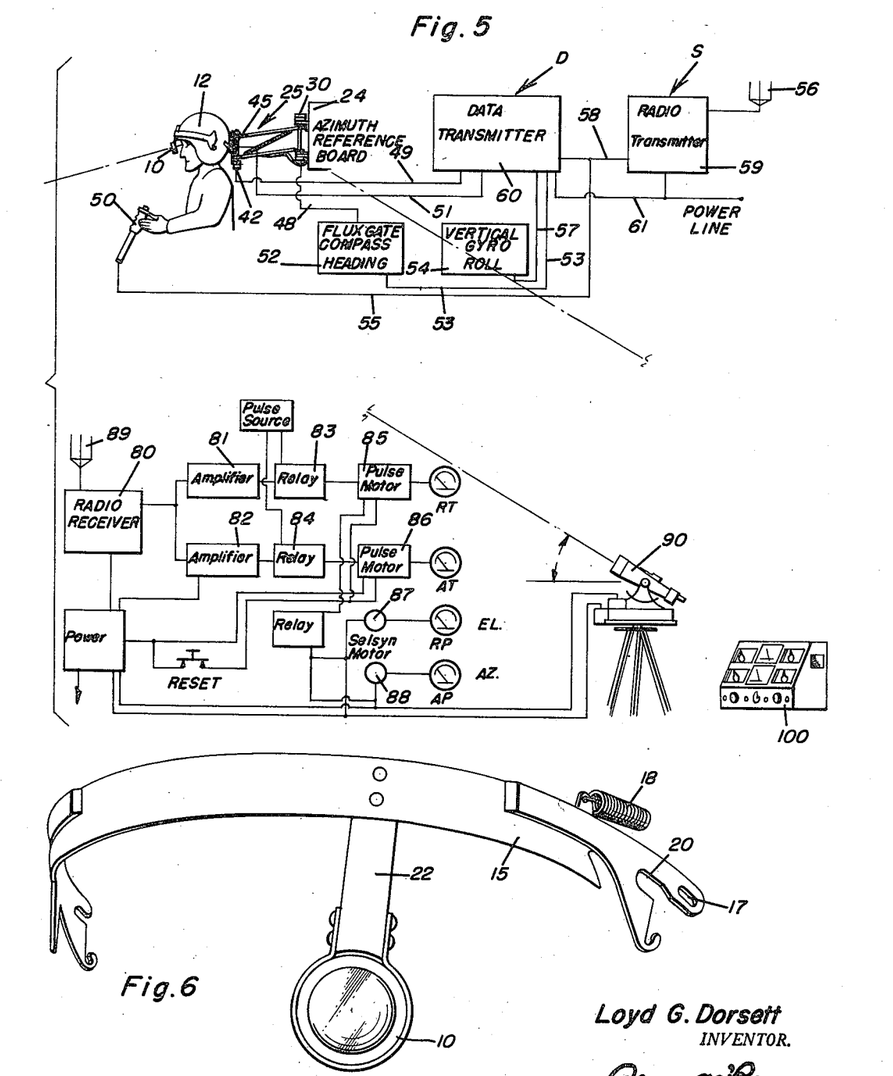
Figure 5 is a diagram outlining the air-borne and ground equipment for carrying the "basic" method into effect.
Figure 6 is a perspective view of a vizor attached to an airman's hemet with a sight used by the air-borne observer.
Figures 7, 9:
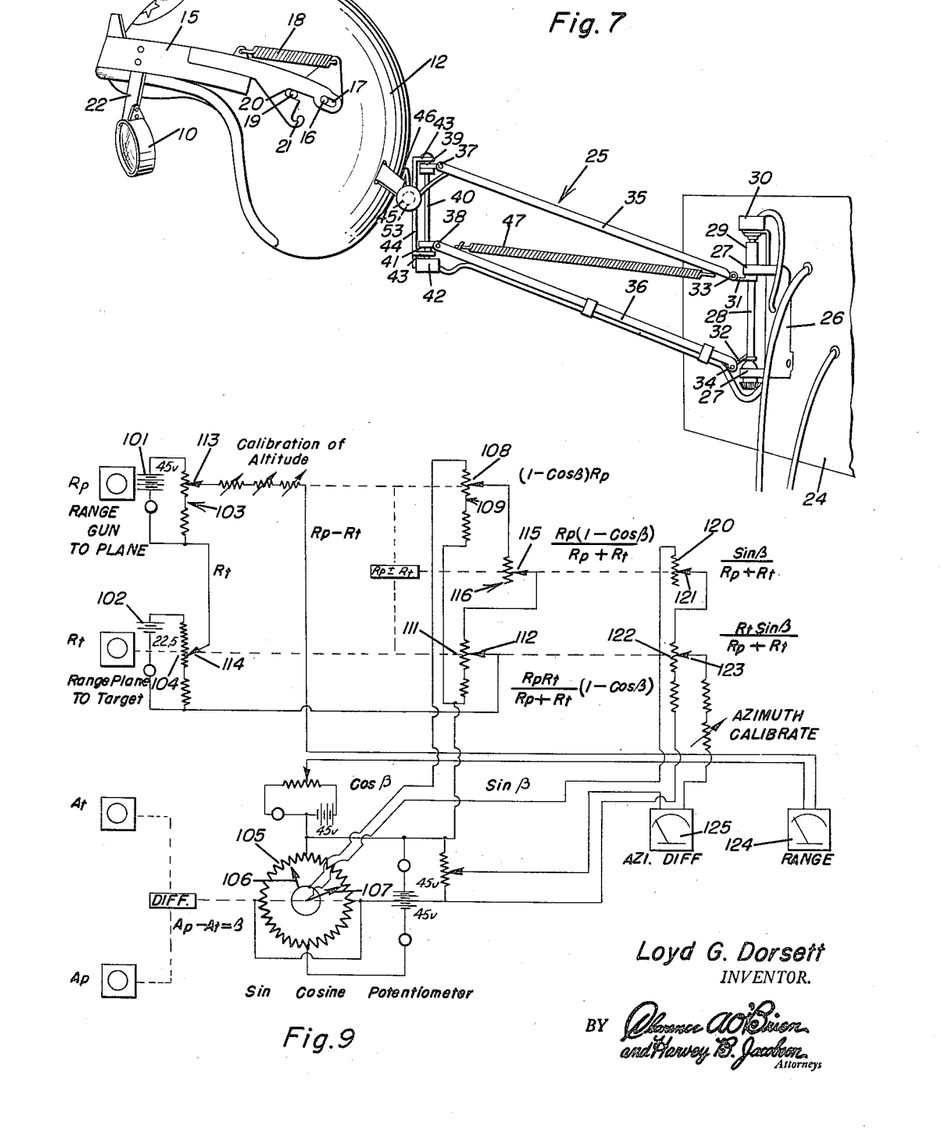
Figure 7 is a diagram illustrating the automatic registering of azimuth and depression angle data by equipment associated with an airman's helmet.
Figure 9 is a diagram of the connections of the computer illustrated in Figure 5 only in outline.

The sight, indicated at 10 in Figures 5, 6 and 7 is, in this case, preferably attached to the helment 12 worn by the air-borne observer in the high performance aircraft. The sight 10 is attached to the vizor bracket 15 by means of a depending arm 22 which may be fastened to the vizor and which brings the sight directly before the eyes of the observer when the vizor is moved into its lowermost position. The vizor bracket 15 is a standard equipment. It is pivotally mounted on the helment 12 by means of a pivot 16, which pivot, however, may slide within a slot 17, provided at the end of the vizor. The vizor is retained in its operative position in which the sight is before the observer's eyes by a stop pin 19 which enters the slot 26, preventing upward movement of the vizor, and by the spring 18 which keeps the pin in the slot. When the vizor is pulled forwardly the pin 19 leaves slot 20 and the spring 18 exercises an upward pull and removes the sight from its position in front of the eye of the observer or pilot. When moved upwardly the vizor is retained by a hooked projection 21. It is thus seen that the sight may be brought into its proper position in front of the eye of the observer or removed therefrom by a simple, single manipulation.

The sight 10 is preferably a collimated reticle sight, so that movements of the head of the observer within the helmet will not affect the aligning of the sight with the target.

The helmet 12 carrying the sight 10 is connected by means of a linkage with a fixed baseboard 24 mounted in the plane in a position which is preferably "vertical" or perpendicular to the longitudinal axis of the plane and which forms a reference plane within the airplane. The purpose of the linkage is to translate the orientation which is given to the helmet by the observer or pilot relatively to the baseboard into azimuth indications which are themselves translated into electrical values which may be transmitted to the ground station by means of the short wave transmitter.

For this purpose the linkage, generally indicated at 25 is supported on the baseboard 24 by means of a bracket 26 with two projecting lugs or flanges 27. These flanges or lugs are provided with bores through which a vertical shaft 28 passes. The vertical shaft is supported on the bracket flanges 27 by suitable collars 29 mounted on the shaft. The "vertical" shaft 28 is thus movable around an axis which is parallel to the baseboard and which is at right angles to the longitudinal axis of the aircraft and in the normal position of the aircraft is supposed to be vertical.

The shaft 28 is connected with the cursor of a potentiometer 30, the casing and fixed resistances of which are fixedly held by the bracket 26 or baseboard 24. Any rotation of the shaft 28 will thus rotate the cursor of the potentiometer relatively to its fixed resistance and, if a constant voltage is applied to the potentiometer, the voltage appearing at the cursor accurately indicates the angle through which the cursor and the shaft have moved.

The shaft 28 moreover carries two forked collar-like members 31, 32 which are fixedly connected with the shaft. The prongs of the forked portions of each member 31, 32 hold a pintle 33, 34 respectively arranged in a direction substantially at right angles to the axis of the shaft 28. The pintle passes through eyes at the ends of two linkage levers 35, 36 which are attached, by similar pintles 37, 38, to forked collars 39, 41, mounted on an axle 40 which is parallel to the axle 28. The axle 40 is journaled in bores of flanges 43 of a bracket 44 and it carries the potentiometer 42, the cursor of which is connected with the axle while the housing and fixed resistance of the potentiometer is connected with the bracket 44.

Attached to the bracket 44 is an arm 46 which is hinged to the said bracket by means of a pintle 53 or pin which is again attached to the cursor of a potentiometer 45. The casing of the potentiometer and the fixed resistance within said casing is attached to the bracket 44. The arm 46 may be bent and is attached to the helmet 12 in such a manner that the helmet may be moved around an axis which is either coincident with the heading of the plane or the longitudinal axis thereof or which is inclined at a certain (small) angle relative to the longitudinal axis of the plane but which lies in the ("vertical") plane of symmetry of the airplane passing through the longitudinal axis of the same.

The assemblies of the two axles 28 and 40 together with the two linkage levers 35 and 36 form a parallelogram, one side of which is attached to the helmet and may be lowered or raised without affecting the parallelism of the two axles 40 and 28. It will also be clear that the rotation of the two potentiometers 42 and 30 corresponds exactly to the rotaion in azimuth (relatively to the heading of the plane) which is necessary to sight a target through the sight 10.

If the two potentiometers 42 and 30 are linear, and if the voltages for the rotational movement through one degree are identical, and if the voltages at the cursors are appropriately added together, the total voltage will represent the total azimuth rotation of the bracket 44. The potentiometer 45 which is at right angles to axle 40 is so mounted that the displacement of its cursor along its fixed resistance (which occurs around a substantially horizontal axis in the normal position of the aircraft) causes a voltage to appear at its cursor, which when a suitable voltage is applied to the fixed resistance corresponds exactly to the angle of depression of the sight 10 of the target relatively to a horizontal line.

The linkage lever system therefore permits an exact indication of the azimuth angle and of the depression angle by means of the voltages appearing at the cursors of the potentiometers.

Since the sight 10 is a collimated sight, slight movements of the head within the helmet will not affect the accuracy of the sighting. The weight of the helmet is preferably taken up by the spring 47 linking the two levers 35 and 36 counteracting the action of gravity on the helmet.

By means of the three potentiometers supplied with a direct current voltage the azimuth data as well as the depression angle may be transmitted to the ground station without necessitating a reading of the data by the observer or the pilot in the airplane. The data correspond to the voltage fraction which is found on the cursor of the potentiometers; the two potentiometers 30 and 42 registering the azimuth angle, while the potentiometer 45 registers the depression angle.

To obtain a correct indication the data furnished by the potentiometers must be supplemented by a vertical gyroscope and by a compass. The latter may be one of the well known gyroscopic compasses or flux gate compasses.

Figure 5 shows diagrammatically the transmission of data using the normal short wave transmitter of the airplane equipment. The data transmitting equipment is generally shown in Figure 5 at D. The data transmission to the ground is initiated by the pilot or observer by means of a push button switch 50 which is pressed in the desired moment.

As above explained and as also indicated in Figure 5, the helmet 12 equipped with the sight 10 and carried by the linkage 25 operates the three linear potentiometers 30, 42, 45, each provided in a manner not shown in the drawings with a constant voltage; the cursors of the potentiometers which are linked to their respective shafts or pivot pins being connected with the lines 48, 49, 51 respectively. The rotation of said cursors is directly a function of the azimuth or depression angle respectively, as has been explained above.

The line 48 leads to the reference device which may be a flux gate compass 52 or some other gyroscopic or magnetic device which indicates the heading and relates the azimuth angle of the airplane to a reference system; by adding its voltage indication to that of the potentiometers 30 and 42 it permits to obtain the basic azimuth reading of the target azimuth, as observable on the airplane, relatively to a selected reference system. The combined or corrected data are then transmitted to the data transmitter 60 over the line 53.

To correct the azimuth reading with respect to the roll and pitch of the plane a vertical gyro-compass 54 is provided furnishing a correcting voltage transmitted over the line 57 to the data transmitter which combines this datum with the azimuth data.

The data transmitter D after having combined the voltage indications from its different sources, stores them and at a given moment the resulting signal is transmitted to the radio transmitter, generally indicated at S and consisting of the usual transmitter circuits and tubes and the antenna 56.

The power line providing power for the various units is indicated at 61. The connection 58 between the data transmitter 60 and the radio transmitter 59 is controlled by the line 55 which leads to the "marking" or push button switch 50 pressed by the observer at the moment when he has the selected target in sight in such a position that the sight error is negligible and in which therefore he wants the ground observer to make his readings on ground.

Figure 8:
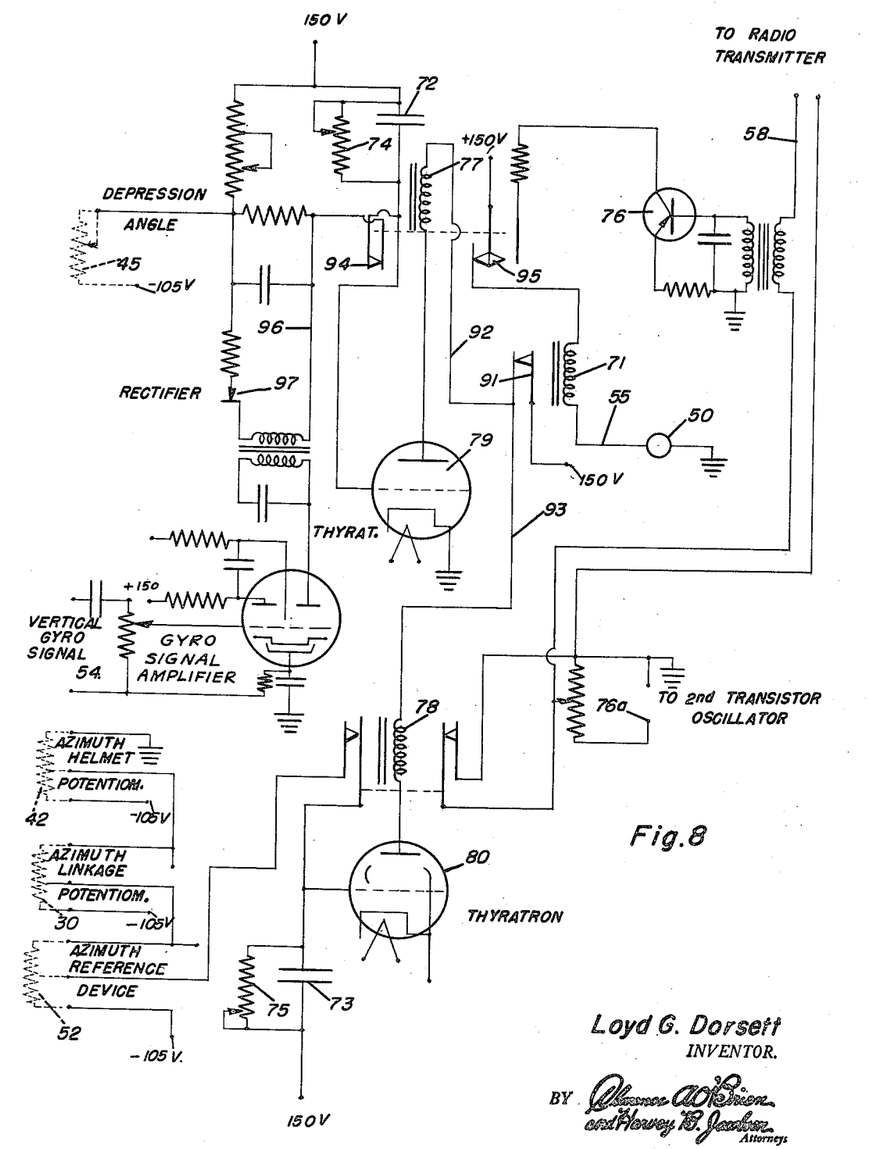
Figure 8 is a diagram showing the basic connections of a "data transmitter" such as illustrated in the shape of a block diagram in Figure 5.

The data transmitter shown in detail in Figure 8 essentially uses condensers 72, 73 which have a discharge circuit including high resistances 74, 75. A relay 71 is provided which is controlled by the circuit 55 and the "marking" switch 50 which forms part of the circuit 55. This relay closes momentarily, opening at its contact 91 the connection of the energizing circuits of the two thyratrons 79, 80 with the source of current for an instant.

The energizing circuits of each thyratron encloses one of the relays 77 and 78 respectively which control the audio frequency signals 76, 76a transmitting to the radio transmitter an audio signal the duration of which is proportional to the charge which has accumulated on one of the two memory condensers 72, 73.

The thyratrons are so biased that they do not fire with their normal grid bias and that their grid bias voltage is only raised to the firing point by the discharge of the memory condenser 72 or 73, respectively. When the voltage stored in the memory condenser drops below a certain value the thyratron current again ceases to flow.

The operation of the data transmitter when described briefly in a general way is the following:

The voltage impressed on the potentiometers 30, 42, 45 reproducing the azimuth (30, 42) and the depression angle (45) are D. C. voltages and the D. C. voltages taken off at the cursors of the potentiometers therefore correspond exactly to the azimuth and depression angles of the target respectively. These potentiometer cursor voltages are connected with and charge the memory condensers 72, 73, the former being charged by the potentiometer 45 corrected by the vertical gyro signal voltage, and the latter condenser 73 being charged by a suitable combination of the voltages of the potentiometers 30, 42. The charge which these condensers receive, therefore represents the value of these angles. The condenser charge produced by the potentiometers is increased or decreased by the reference devices such as the flux gate compass 52 or the vertical gyro 54. It is assumed that the latter produces an A. C. signal which is amplified and rectified (at 97) in the circuit 96, before being impressed on the charging circuit of the condenser 72.

The breaking of the connection is the result of the momentary energization of relay 71. When energized the contacts 91 of relay 71 are opened, thus interrupting the connection of the normally closed thyratron circuits 92, 93 with the source of current connected with 91. If at this moment there was any current flow through the thyratron such flow ceases. Normally however no current flows as the thyratrons are biased below firing potential. The relay 71 is again de-energized when the thyratron circuits are again closed, but no current flows as they are still biased below the firing point until the condensers begin to discharge.

The relay 77 when de-energized, in addition to the closing of the grid condenser discharge circuit at contact 94, also opens the connection of the circuit of relay 71 to the source of current at contact 95. Thereby the energizing voltage is again applied to circuits 92 and 93 and upon discharge of the memory condensers 72 and 73 current flows through the thyratrons for a period of time which corresponds to the value of the charge. During this flow of current through the thyratron 79 the relay 77 is energized. This relay keeps the circuit of the transistor 76 closed thus producing an audio frequency signal the duration of which corresponds to the condenser charge. This signal is transmitted to the radio transmitter 59.

The relay 77 also keeps the circuit of relay 71 open, preventing interference with the signal by means of this relay.

The thyratron 80 and the relay 78 operate in a similar way connecting a second source of an audio frequency, either a second transistor oscillator 76a or any other available source of audio frequency with the circuit 58.

The ground equipment (Figure 5) consists of the receiver 80, connected with an antenna 89, which receiver is connected with the two amplifiers 81, 82 for the two oscillations received, a pulse source, the relays 83, 84 and the pulse motors 85, 86 which are ratchet or impulse motors driving the indicators AT and RT.

The indicators which are diagrammatically shown at AT and RT, permit to the ground observer to measure exactly the duration of the two signals received and also to record these signals. Preferably the indicators permit directly the reading of the angles. These indicators may be voltage indicators which indicate the voltage up to which a condenser has been charged through a suitable resistor during the period during which the signal was received or as shown in the drawing they may each be provided with a dial on a shaft turned by a pulse motor which is operated through a relay from a source of pulse currents as long as the audio signals are received and the relay is operated.

The voice radio transmitting equipment is not shown as it is assumed that the standard equipment is used and that the ground observer in this case also gets his "attention" signal alerting him for the observation of the main signals, over the voice radio.

The two indicators RP and AP register the azimuth and elevation of the airplane as taken by the ground instrument 90 by means of Selsyn motors 87, 88 driven by corresponding Selsyn units connected with the instrument.

As already stated, the instrument 90 which is shown as being a customary geodetical survey instrument with an azimuth and elevation scale, may be a radar airplane detector which supplies not only azimuth and elevation but also the slant range, so that the altitude of the airplane need not be measured separately. When a geodetical instrument is used, the altitude must be read on the altimeter of the plane which is generally a barometric instrument, checked on ground before taking off, and any change in the barometric pressure during the flight is preferably checked on the ground by a fixed barometric instrument in order to correct the reading at the moment of the measurement.

The combined data, namely those received at the ground station from the plane and those which result from the observation made by the ground observers are then fed into the computer 100 which determines the range and the azimuth of the target.

The computation is rendered automatic using trigonometric calculations based on a formula akin to the well known formula usually termed "law of cosines," giving directly the result which consists in the azimuth range of the target.

According to the law of cosine the range R from the ground station G to the target T (see Figure 1) is $$R = \sqrt{R_p^2 + R_t^2 + 2R_pP_t \cos \beta}$$

where $\beta$ is the difference between the plane-target azimuth $A_t$ and the ground station-plane azimuth $A_p$. The azimuth ground-station-target A is therefore $$A = A_p \sin^{-1} \frac{R_t \sin \beta}{R}$$

$R_t$ and $R_p$ are obtained by multiplying the height of the airplane H with the cotangent of the depression angle $d$ and elevation angle $e$ respectively $R_t = H \cot d$; $R_p = H \cot e$.

When the slant range $R_{sl}$ from ground station is used $R_t = R_{sl} \cos e$ and $H = R_{sl} \sin e$ so that $R_t = H \cot d$.

Tabulating the values of R with a number of angles, it is found that for angles which are smaller than 45° the difference between R and the sum $R_t + R_p$ is small. The formula when converted by series expansion and when neglecting the terms of the 3rd, 4th and higher orders which become very small for values of $\beta$ below 45° may be transformed into the expression:

$$R = (R_p + R_t) - \frac{R_t R_p}{R_t R_p}(1 - \cos \beta)1.02$$

This formula for angles below 45° yields values which deviate only by a maximum of .915% from the value set up according to the strict trigonometric formula. This transformed formula permits a great simplification of the computor circuits.

Likewise the formula $$A = A_p \sin^{-1} \frac{(R_t \sin \beta)}{R}$$

for the ground station-target azimuth may be simplified by substituting the angle for the sine which is a permissible substitution for small angles, and thus the formula may be written as follows:

$$A = A_p \frac{R_t \sin \beta}{R_t + R_p}$$

With the value $\beta = 30°$ (which is derived from the law of sines (a common angle used in practice), and with the relation of $R_p:R_t = 3$ (a relation which assumes that the airplane is at a distance from the target three times the distance from the ground station) the error in azimuth is only 6 mils. If a constant factor 1.04 is used this formula is more accurate having an error of only 2 mils at 30° and 13 mils at 60°.

For the purpose of computing the range and azimuth of the target the data which have been furnished by the instruments AT, AP, RT, RP are fed into the computor. This is done by setting up the voltages corresponding to $R_p$ and $R_t$ which are derived from independent sources of current 101, 102 (Figure 9) by means of the potentiometers 103 and 104. As seen, the sum $R_p + R_t$ of the two voltages may be introduced into any expression by a series connection.

The circular potentiometer 105 with its two cursor arms 106, 107 permits to introduce the sine and cosine, if the angles are small and therefore both are directly or inversely proportional to the angle through which they are moved.

The difference between $A_p$ and $A_t$ corresponds to the angle $\beta$ in Figure 1 and if the sine cursor 106 is set at this angle the voltage corresponds to the value of $\sin \beta$; at the same time the cursor 107 is set to tap a voltage which is proportional to $\cos \beta$.

Therefore, if the cursors 113 and 108 of the potentiometers 103 and 109 as well as the cursors 114, 112 of the potentiometers 104, 111 are mechanically connected, as indicated by dotted lines in Figure 9, while the potentiometers are supplied from the cosine cursor of potentiometer 105 the voltage at 108 corresponds to $$R_p - R_p \cos \beta = R_p (1 - \cos \beta)$$

and by connecting the potentiometer 116 with the cursor 108, the cursor 115 when moved to a position corresponding to $R_p \pm R_t$ furnishes a voltage corresponding to $$\frac{R_p(1 - \cos \beta)}{R_p + R_t}$$

By further connecting cursor 115 of the potentiometer 116 with potentiometer 111 by virtue of the mechanical connection between the cursors 114 and 112, and by moving the latter into a position corresponding to $R_p$ the result $$\frac{R_p R_t}{R_p + R_t}(1 - \cos \beta)$$

is obtained at the cursor 112 and the voltage at 112 thus corresponds exactly to the range as seen from the formula stated above except for the constant factor which may be taken care of by suitable adjustment, for instance by adjustment of the two batteries of the cosine potentiometer, changing their voltage to 46 V.

The computation of the azimuth is obtained in a similar way. The circular potentiometer 105 when set at $\beta$ gives a value corresponding to $\sin \beta$ at its connection with arm 107 which value is impressed on potentiometer 120, the cursor of which shifts in proportion to the value $R_p \pm R_t$ as indicated by the dotted line in Figure 9 The voltage at the cursor therefore corresponds to a value $$\frac{\sin \beta}{R_p + R_t}$$

and if this voltage is impressed on the potentiometer 122 the cursor of which moves in accordance with the value of $R_t$ the resulting voltage corresponds to $$\frac{R_t \sin \beta}{R_p + R_t}$$

The instrument 125 then indicates directly the voltage which corresponds to the difference $A - A_p = \alpha$.

In the preceding explanation it has been assumed that the ground station, the airplane altitude base line and the target are all at the same level. This will however rarely be the case. The difference between this assumption and the actual level of the three points may be met by using radar equipment also on the airplane. With slant range measurement from the ground to the plane and from the airplane to the target the result is independent of the difference between the elevation of the points G, P and T.

If no radar equipment is available the error must be corrected by maps. However, the error as a rule is not large. As the methods for correcting this error do not form part of this invention this correction is not described, but it is only mentioned in order to make it clear that the error does not cause a serious defect.

The two voltage indicating instruments 125, 124 provide indications which may, if necessary, be transformed by means of a well known second computer or by an extension of the one shown into the gunnery data for guns not located at the place of observation.

The above described "basic method" and the equipment used for such basic method may be greatly simplified by using additional signalling means.

Figure 2:
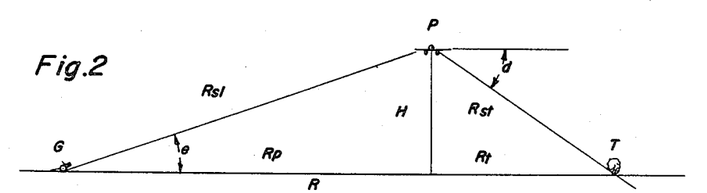
Figure 3:
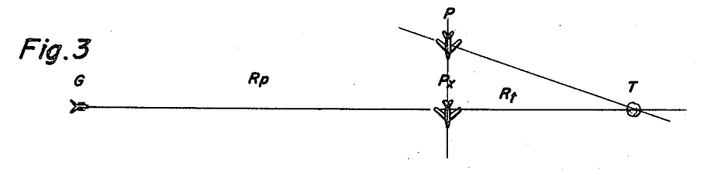

Referring to Figures 2 and 3 it will be seen that, if the observer in the airplane P is in a position to keep his sight on the target and to transmit a signal to the ground observer in the moment in which the plane target sight line and the plane-ground station sight line coincide, all azimuth computations can be dispensed with, as the azimuth is then directly found by the ground observer when setting his sight on the plane and reading the azimuth in the moment in which he receives this additional signal from the plane. Especially if the ground station-plane-slant range can be determined, the finding of the range and azimuth of the target reduces the air observation to the observation of the depression angle and to the transmission of a signal when the plane P reaches the position indicated in Figure 3 at $P_x$.

To eliminate the difficulty connected with a constant observation of the relative position of the plane with respect to both the ground station and to the target simultaneously, the correct position of the plane at the right moment is preferably indicated by suitable equipment, automatically transmitting a signal to the ground observer when the plane is in the right position in which the points G, $P_x$ and T are all aligned.

Figure 10:
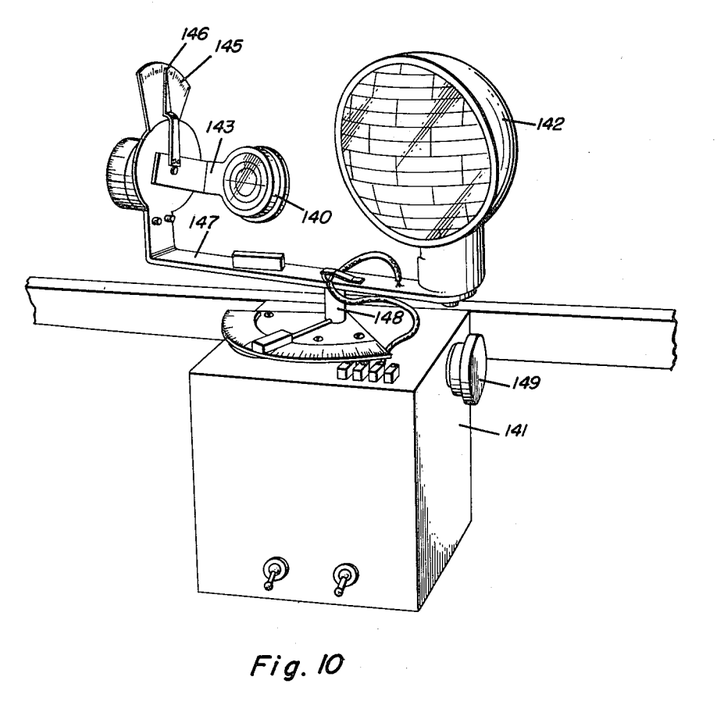
Figure 10 is a perspective view of the light signal apparatus used as a substitute for radio or voice signals in connection with the "single ray" and "multiple flash" methods.

Equipment of this type giving an automatic signal is illustrated in Figure 10.

The observer of the airplane is provided with a depressed angle optical sight 140 which may be moved downwardly from the horizontal, the depression angle being read on a suitable scale 145 and pointer 146 associated with the arm 143 on which the sight is held. The sight must be provided with crossed reticles and it is preferably mounted on a tracking unit 141 which contains a constant speed motor, a variable speed transmission and a control knob differential 149 to insert the target reticle translation, as well as a target tracking unit. This tracking unit need not be described as it is a standard unit used in connection with many instruments. The sight structure is carried by an arm 147 which is mounted on an axle 148 preferably arranged in a vertical position in the plane when the latter is in its normal flight position. The axle 148 is connected with the tracking unit 141 and is driven by the motor of the tracking unit. On the other end of the arm 147 a directional beam projecting searchlight lamp 142 is attached which therefore rotates with the sight about the axle 148. The beam of the searchlight lamp is so arranged that it is directed at the back azimuth, that is on the azimuth directly opposite to the azimuth of the sight line. The searchlight lamp must emit a very powerful beam which may be seen from the ground station over wide ranges of the aircraft elevation angle. The lamp must therefore have a wide vertical beam but an extremely narrow horizontal beam width.

To emit such a beam the special lamp 142 is preferably equipped with a parabolic reflector which may be used in conjunction with a linear filament light or with a spot filament and either a reflector or a condenser lens may be used. Preferably, however, a cylindrical lens is used in conjunction with the parabolic reflector.

Lamps of this type have been constructed for various other purposes and, for instance, the special Westinghouse fog lamp 40158 answers this description. This lamp has a cylindrical lens and a beam reflector emitting a beam of small width over a wide angle. Clearly the accuracy of the method depends on the width of the beam, but as the accuracy is also connected with other factors it is unnecessary to make the beam narrower than required by these factors.

This method which is hereinafter termed "single ray" method may be carried out in the following manner. The airborne observer as customary is supposed to be in radio communication with the ground observer. After the target has been spotted the air-borne observer will have an approximate idea of the relative position of ground station and target and may therefore make quite a short target location run during which he endeavors to cross with his airplane the line connecting the ground station and the target. During this run he simply keeps his sight on the target by means of the azimuth tracking aid 141.

The ground observer also has his sight set on the plane and tracks it by means of an azimuth follower of some kind. In the moment in which he observes the flash from the searchlight mounted on the observer's sight he marks the azimuth and elevation on the scale of his instrument or in the event that he tracks the plane by radar he reads the slant range and the elevation and transmits by radio a signal to the airplane observer. Upon receipt of this signal which may be a tone signal or simply a voice signal the air-borne observer marks by means of the scale 145 and pointer 146 the depression angle angle $d$ and the altimeter in his plane and transmits the result of his reading by radio to the ground observer.

As seen from Figure 2 the range R of the target is now merely the arithmetic sum of $R_p + R_t$ and the azimuth of said target has been determined directly by the flash signal. The method of using a flash signal is clearly equivalent to the establishing of a rotating light at a point directly above the target. When the flash is seen the target azimuth from the ground instrument is immediately determined.

$R_p$ is now easily calculated as $$R_p = H \cot e$$

and $$R_t = \cot d$$

Therefore the target range $R = R_p + R_t$ is equal to the airplane's height H divided by the tangent of the elevation angle plus the airplane's height divided by the tangent of the depression angle.

The determination of $R_p$ and $R_t$ is therefore possible without any complex computation and without the use of a computer and merely simple mechanical instruments, tables or calculators may be used.

The "single ray" method eliminates azimuth reading by the air-borne observer and reduces the observation to be made by the air-borne observer to the depression angle and altimeter observation. This method may therefore be carried out with light aircraft and it reduces very materially the time the aircraft must be in the air for making its target observation run, thus making it unlikely that the aircraft will be disturbed either by ground fire or by intercepting actions.

A further reduction of the activities of the air-borne and ground observer and a correspondingly simplification of the equipment may be obtained, if a plurality of spaced ground stations are available for the observation of the aircraft. This much simplified method will be hereinafter termed "multiple flash base" method and it consists, as will be seen from Figure 4, in registering the flashes produced by the beam projecting searchlight associated with the air-borne sight—described in connection with the "single ray" method illustrated in Figures 2 and 3—by a number of spaced bases or ground stations G1, G2, G3.

Figure 4:
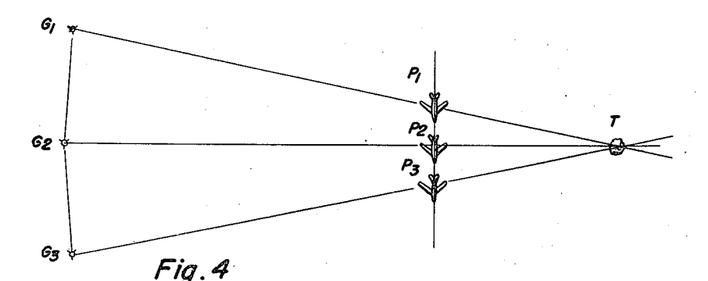

The flashes of the beam emitted by the lamp connected with the air-borne sight which has been pointed to the target by the air-borne observer permit to obtain directly the azimuth of the target relatively to a plurality of spaced points and therefore all vertical measurements may be dispensed with and no measurement of the elevation or depression angle on the ground or by the air-borne observer or of the altitude of the aircraft is necessary to determine the range and azimuth of the target relatively to any further selected point, such as a gun position. This "multiple flash base" method can therefore be carried into effect with a minimum of equipment and of observer activity, but it requires a plurality of ground observer stations and ground observers.

The type of equipment used is practically identical with that used in the "single ray" method described in connection with Figures 2 and 3 and this equipment is therefore not separately illustrated; however the units may be simplified to a material extent. The sight, for instance, need not have any means for measuring the depression angle and moreover may be a sight with a very large field of view which may only be provided with a vertical recticle, since it is unnecessary with this method to move the air-borne sight in a vertical direction while locating the target in azimuth. Preferably, however, the sight is still equipped with a tracking unit.

The beam projecting searchlight lamp may be identical with that already described and likewise its connection with the sight is the same as that described in connection with Figure 10.

The operation will be clear from the above description the air observer after having scanned his search area and having acquired a target informs the ground stations by radio that the target's location is to be determined during the following location run, which run must be so selected that it crosses the ground station-target lines. No further condition need be fulfilled. The air-borne observer now during this run has merely to keep his sight on the target but he is not bound to follow any specific course.

The air-borne observer is also completely relieved of the burden of making further observations, his sole activity consisting in keeping the sight on the target during the completion of the run until he has received signals from all ground observers indicating that the flash signal of his lamp was registered at the ground stations.

The ground observers have only to track the airplane and to register the azimuth of the plane at the moment at which the flashes are received. The method is again the equivalent of observing a turning light erected above the target from a plurality of observer stations, a method which permits to determine directly the range and the azimuth with respect to any point in known spatial relationship to the points of observation.

The azimuth and range of the target may be determined by the data recorder receiving the data from the three ground stations on a plotting board or by means of any well known plotting or computing device.

The flashes may be produced by invisible rays and may be recorded by well known means used to make such rays visible to an observer.

When using any one of the methods described, the ground stations may be provided with well known automatic azimuth followers, operated by radio transmitted signals in which a light ray is sent towards the aircraft provided with a photo-electric cell which when excited by the ray sends automatically a radio signal back which causes the azimuth follower to register the azimuth at the moment at which the photo cell was excited. This type of apparatus is part of the known equipment which may also be used with advantage to facilitate the activity of the ground observers or to keep the ground observer stations unmanned.

The use of this azimuth finding equipment however does not produce any change in the basic methods or in the basic equipment.

Air-borne equipment used for high performance aircraft and described in connection with the "basic" method may of course also be used in connection with the other two methods which have been termed "single ray" method and "multiple flash base" method, although it will not be necessary in most cases because the activity of the aircraft and of the air-borne observer is reduced to such an extent that no further mechanical means are necessary. Each of the methods described has moreover its own special field of preferred applications in which it is most useful.

The use of a high performance aircraft permits the observer to spot and to locate a target at any point and to reduce target location to a single short operation which is almost one with the acquisition of the target. With the two other methods spotting and location is done in a sequence of operations. As soon as a target is acquired and the air observer is in a favorable position he may immediately start his location run which, usually, is short but nevertheless it is assumed that during the time necessary for making the run no interception will take place. With the "basic" method, however, spotting and location is practically one and the same operation and only the establishing of radio contact with the ground station need take place. This method is therefore most valuable in case that the aircraft has penetrated deeply into enemy territory.

It will be clear that many steps of the method and of the the equipment may undergo unessential changes without in any way departing from the essence of the invention as defined in the annexed claims.

What is claimed as new is as follows:

1. In a target locating system including a ground observation station and an air observation station located in an aircraft, equipped with sight means adapted to be pointed on the target, the position of which determines the azimuth of the target relatively to the aircraft heading, means for determining the depression angle of the target relatively to the aircraft, associated with said sight means, means for determining the aircraft position relatively to the ground observation station, including means for determining the azimuth and elevation of the aircraft relatively to said ground observation station, signal means for transmitting and receiving signals in the ground observation and air observation stations, to produce a simultaneous observation of the azimuth and depression angle of the aircraft relatively to the aircraft and of the altitude, azimuth and elevation of the aircraft relatively to the ground station, said air-borne sight means including means for translating the values corresponding to the azimuth position of the sight and to the depression angle of the same into electrical impulses, means including a gyroscopic means for producing electric impulses in accordance with the spatial position of the aircraft, a data transmitter unit for registering and combining the impulses and a radio transmitter, said data transmitter transmitting the combined pulses to the radio transmitter, means for controlling the transmission of combined impulses to the radio transmitter manually controlled by an observer keeping the sight means directed towards the target, signal means associated with said data transmitter to produce a radio transmitted signal, the observer when operating the control means thus simultaneously producing a transmission of a radio signal, and a transmission of the impulses corresponding to the azimuth position and the depression angle at the moment of signal transmission corrected for the spatial position of the aircraft to the ground station.

2. An automatic target location system as claimed in claim 1, wherein the sight means is attached to the airplane by interconnected linkage members forming a movable linkage moved during the sighting operation in proportion to the movement of the sight directing the same towards the target, means for translating a mechanical movement into an electric voltage proportional to said movement connected with a stable source of current being connected with the linkage members, the said translating means having cursor elements connected with linkage members and moved in proportion to the movement imparted to the sight when directed towards the target, the voltages thus obtained forming the impulses transmitted to the data transmitter.

3. An automatic system as claimed in claim 1 wherein the sight is attached to a helmet worn by the observer, said helmet being connected with a parallelogram linkage fixed to the airplane.

4. An automatic system as claimed in claim 1 wherein the sight is attached to a helmet worn by the observer, said helmet being hingedly connected with a parallelogram linkage, the movement around the hinge corresponding to the depression angle of the target.

5. An automatic system as claimed in claim 1 wherein the sight is attached to a helmet worn by the observer, said helmet being connected by a hinge with a parallelograme linkage, the movement around the hinge corresponding to the depression angle of the target, said hinge being connected with a potentiometer, the cursor of which is moved by the hinge, the position of said cursor thus indicating the magnitude of the depression angle.

6. An automatic system as claimed in claim 1, wherein the sight means is attached to the airplane by interconnected linkage members moved during the sighting operation performed by the observer in two angular directions in proportion to the angular movements of the sight relatively to the airplane axis, means for producing electric voltages proportional to a mechanical movement electrically connected with a source of currents and having a cursor element mechanically connected with the linkage members moved in proportion with the movement imparted to the linkage members by the sight for each of the two angular directions the voltages thus obtained at the cursors of the means for producing electric voltages proportional to a mechanical movement being thus proportional to the movement imparted to the linkage members in the said directions, means for storing the voltages appearing at the cursors, means controlled by the observer for disconnecting the means for producing electric voltages proportional to a mechanical movement from the storing means and for closing a discharge circuit for each of said storing means, means for producing a current of definite frequency during the discharge of each of the storing means through its discharge circuit, said current of a definite frequency flowing therefore during a period of time proportional to the stored voltages, said currents being transmitted to the radio transmitter and modulating a radio signal emitted from the plane.

7. An automatic system as claimed in claim 1, wherein the sight means is attached to the airplane by interconnected linkage members moved during the sighting operation performed by the observed in two angular directions in proportion to the angular movements of the sight relatively to the airplane axis, a translating means producing electric voltages proportional to the mechanical movement of a movable cursor element electrically connected with a source of currents, a cursor one of said last named translating means being mechanically connected with the linkage members moved in proportion with the movement imparted to the linkage members by the sight for each of the two angular directions, the voltages thus obtained at the cursors of the said last named translating means being thus proportional to the movement imparted to the linkage members in the said directions, means for storing the voltages appearing at the said cursors, means controlled by a reference device for supplying an additional voltage to the storing means in order to produce a voltage proportional to the extent of the angular displacement in one direction relatively to a fixed direction of origin, means controlled by the observer for disconnecting the said means for producing electric voltages proportional to the mechanical movement of a movable cursor from the storing means and for closing a discharge circuit for said storing means at a predetermined instant, means for producing a current of a definite predetermined frequency during the discharge of each of the storing means through its discharge circuit, said currents of a definite frequency flowing therefore during a period of time proportional to the stored voltages, said currents being transmitted to the radio transmitter and modulating a radio signal emitted from the plane.

8. An automatic system as claimed in claim 1, wherein the sight means is attached to the airplane by interconnected linkage members moved during the sighting operation performed by the observer in two angular directions in proportion to the angular movements of the sight relatively to the airplane axis, a potentiometer electrically connected with a source of currents and having a cursor mechanically connected with the linkage members moved in proportion with the movement imparted to the linkage members by the sight for each of the two angular directions, the voltages thus obtained at the cursors of the potentiometers being thus proportional to the movement imparted to the linkage members in the said directions, means for storing the voltages appearing at the cursors of the potentiometers, an electronic discharge tube with a control electrode, associated with each discharge circuit, said control electrode being located in the discharge circuit and when not charged supressing, but when charged initiating a flow of current through the electronic tube, a relay controlled by said electronic tube, means for producing a flow of a current of predetermined frequency controlled by said relay, means for controlling said relay by hand, said hand operated means initiating the flow of current of predetermined frequency, said flow of current being again suppressed upon discharge of the storage device to a predetermined extent, when the latter ceases to supply the control electrode with voltage, the current of predetermined frequency thus flowing during a period proportional to the voltage stored, which is proportional to the angular displacement in one direction and being transmitted to the radio transmitter, so as to modulate a radio signal emitted by said transmitter towards the ground station.

9. An automatic system as claimed in claim 1, wherein the sight means is attached to the airplane by interconnected linkage members moved during the sighting operation performed by the observer in two angular directions in proportion to the angular movements of the sight relatively to the airplane axis, translating means for converting the angular movement proportionately into electrical voltages, electrically connected with a source of currents, and having an angularly movable cursor mechanically connected with the linkage members moved in proportion with the movement imparted to the linkage members by the sight for each of the two angular directions, the voltages thus obtained at the cursors being thus proportional to the movement imparted to the linkage members in the said directions, means for storing the voltages appearing at the cursors of the said translating means, means controlled by a vertical gyroscopic device maintained in its position in space during the movements of the airplane while in flight, for producing a corrective voltage proportional to the deviation of the plane from the spatial standard position maintained by the gyroscopic device, said corrective voltage being algebraically added to the voltage produced by one of the said translating means and transmitted to one of the storing means, means controlled by the observer for disconnecting the translating means from the storing means at a predetermined instant, means for producing a current of a definite frequency during the discharge of each of the storing means, said current of a definite frequency flowing therefore during a period of time proportional to the stored voltages, said currents being transmitted to the radio transmitter and modulating a radio signal emitted from the plane.

10. An automatic system as claimed in claim 1, wherein the sight means is attached to the airplane by interconnected linkage members moved during the sighting operation performed by the observer in two angular directions in proportion to the angular movements of the sight relatively to the airplane axis, translating means for converting angular movements proportionately into electric voltages, electrically connected with a source of currents and having an angularly movable cursor mechanically connected with the linkage members moved in proportion with the movement imparted to the linkage members by the sight for each of the two angular directions, the voltages thus obtained at the cursors of the translating means being thus proportional to the movement imparted to the linkage members in said directions, means for storing the voltages appearing at the aforesaid cursors, a receiver in the ground station, provided with a plurality of voltage reproducing means, each being operated by the reception of one of the predetermined definite frequencies, pulse motors operated by a local pulse source over an energizing circuit, the latter being controlled by one of said voltage reproducing means and an indicator operated by each of said pulse motors.

11. A computer for a system according to claim 1, comprising a first group of potentiometers, each potentiometer being connected with a source of current and provided with a cursor adapted to be set for a position in which the voltage appearing at the cursor is proportional to a given value, the said first group of potentiometers being connected in series by connecting the end of one potentiometer with the cursor of the next to produce a voltage being the algebraic sum of the values, a second group of potentiometers with cursors each of which is mechanically connected with a cursor of potentiometer of the first group, and having their resistances connected in series, and in addition having also a series connection between one end of the resistance of one potentiometer and the cursor of the next one, this connection including an intermediate potentiometer, the cursor of which is moved in proportion with the algebraic sum of the voltages of the series connected first group, a circular potentiometer connected with a source of current and provided with two cursors, which when at right angles to each other provide voltages proportional to the sine and cosine of an angle respectively, one of said cursors being connected with the second group of potentiometers to produce resulting voltages being dependent on the sine and cosine of a given angle respectively, and indicators for the resulting voltage to compute values consisting of factors which are proportional to a product of single values, algebraic sums of said values and trigonometric functions.

12. A computer for a system according to claim 1, comprising a first group of potentiometers, each potentiometer being connected with a source of current and provided with a cursor adapted to be set for a position in which the voltage appearing at the cursor is proportional to a given value, the said first group of potentiometers being connected in series by connecting the end of one potentiometer with the cursor of the next to produce a voltage being the algebraic sum of the values, a second group of potentiometers with cursors each of which is mechanically connected with a cursor of potentiometer of the first group, and having their resistances connected in series, and in addition having also a series connection between one end of the resistance of one potentiometer and the cursor of the next one, this connection including an intermediate potentiometer, the cursor of which is moved in proportion with the algebraic sum of the voltages of the series connected first group, a circular potentiometer connected with a source of current and provided with two cursors, which when at right angles to each other provide voltages proportional to the sine and cosine of an angle respectively, one of said cursors being connected with the second group of potentiometers and the second cursor being connected with a third series of potentiometers with cursors, one of them coupled mechanically with the cursor of the intermediate potentiometer and the other with the cursor of one of the potentiometers of the first series, and indicators for the resulting voltage representing values which are products of factors embodying single values, algebraic sums of such single values and trigonometric functions.

13. A system as claimed in claim 1 wherein the sight is mounted on a supporting member rotatable around an axis and wherein the directive signal means include a searchlight with a wider beam in one direction and a narrower beam in the other direction mounted on the supporting means of the sight but so directed that the beam is projected in a direction exactly opposite to the direction towards which the sight is pointed.

14. A system as claimed in claim 13 wherein the sight is rotatably mounted on the supporting means, the axis of rotation being at right angles to the axis of rotation of the supporting means.

References Cited in the file of this patent

UNITED STATES PATENTS

| | | |
|---|---|---|
| 1,990,494 | Murphy | Feb. 12, 1935 |
| 2,027,530 | Hammond | Jan. 14, 1936 |
| 2,307,029 | Elm | Jan. 5, 1943 |
| 2,539,901 | Ewing | Jan. 30, 1951 |
| 2,632,157 | Jones | Mar. 17, 1953 |